United States Patent
Gu

(10) Patent No.: US 11,312,438 B1
(45) Date of Patent: Apr. 26, 2022

(54) ADJUSTABALE BICYCLE PARKING RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/190,392

(22) Filed: Mar. 3, 2021

(51) Int. Cl.
*B62H 3/08* (2006.01)
*B62H 3/12* (2006.01)

(52) U.S. Cl.
CPC ............... *B62H 3/08* (2013.01); *B62H 3/12* (2013.01)

(58) Field of Classification Search
CPC ... B62H 3/00; B62H 3/04; B62H 3/06; B62H 3/08; B62H 3/12; A47F 7/04; Y10T 70/5876; Y10T 70/5881; E04G 7/08
See application file for complete search history.

(56) References Cited

U.S. PATENT DOCUMENTS

| | | | | |
|---|---|---|---|---|
| 488,395 | A * | 12/1892 | Justice | B62H 3/08 211/20 |
| 511,367 | A * | 12/1893 | Slater | B62H 3/00 211/22 |
| 547,412 | A * | 10/1895 | Boerum | B62H 3/12 211/17 |
| 4,416,379 | A * | 11/1983 | Graber | B62H 3/12 211/19 |
| 5,050,785 | A * | 9/1991 | Hays | B60R 9/06 224/511 |
| 6,062,396 | A * | 5/2000 | Eason | A47F 7/04 211/20 |
| 6,371,309 | B1 * | 4/2002 | Smith | B62H 3/12 211/17 |
| 6,779,631 | B1 * | 8/2004 | Hensley | E04G 7/08 182/129 |
| 9,610,993 | B1 * | 4/2017 | Ho | B62H 3/06 |
| 9,650,092 | B1 * | 5/2017 | Tsai | B62H 3/06 |
| D855,008 | S * | 7/2019 | Man | D12/407 |
| 10,618,582 | B1 * | 4/2020 | Liu | B62H 3/04 |

OTHER PUBLICATIONS

QAHKP Bicycle Parking Rack Multi-Function Bicycle Display Stand, Three Parking Modes, Retrieved May 16, 2019], Retrieved from internet, https://www. amazon.com/QAHKP-Bicycle-Parking-Multi-Function-Display/dp/B07NTZCRM1/ref=sr_1_4? (Year: 2019).*

(Continued)

*Primary Examiner* — Ko H Chan

(57) ABSTRACT

A bicycle parking rack includes a base to which a first portion is connected. Two first parts are adjustably connected to the first portion. A second portion connected to the base at an angle. The second portion includes a first tube, a second tube and a third tube. A second part is adjustably connected between the first tube and the third tube. A bicycle wheel contacts the two first parts and the second part to form three contact points. The second tube is inserted into the upper end of the first tube and includes a hook end which may hook to an inner periphery of a bicycle wheel. A connection unit is removably connected between two respective bases of two parking racks.

5 Claims, 11 Drawing Sheets

(56) References Cited

OTHER PUBLICATIONS

Delta Cycle Shop Rack Park, Retrieved May 17, 2019], Retrieved from Internet, https://www.amazon.com/Delta-Cycle-Floor-Stand-Storage/dp/B017EEUMF2/ref=sr_1_41? (Year: 2019).*

Bikehand 1-3 Bike Bicycle Floor Parking Rack Storage Stand, Retrieved May 16, 2019], Retrieved from internet, https://www.amazon.com/Bikehand-Bicycie-Fioor-Parking-Storage/dp/B00FLTZ26C/ref=sr_1_15? (Year: 2019).*

* cited by examiner

ADJUSTABALE BICYCLE PARKING RACK

BACKGROUND OF THE INVENTION

1. Fields of the Invention

The present invention relates to a bicycle parking rack, and more particularly, to a bicycle parking rack that is adjustable according to different sizes of bicycle tires.

2. Descriptions of Related Art

Some of bicycles are not equipped with kick stands, so that these bicycle cannot stand alone on the ground. Therefore, a parking rack is needed to place and organize the bicycle. The conventional parking racks generally include wall-mounted parking racks (such as Taiwanese Utility Model M551148 and M479884), vertical parking racks (such as Taiwanese patents 1596028, 1522260, 1369309, Taiwanese Utility Model M483219, and China patent CN209600690U). Although the wall-mounted parking racks do not occupy floor space, it is a little bit difficult to put the bicycles to parking racks, and/or to remove the bicycles from the parking racks. Improper operation may cause the bicycles to fall and may hit objects, or even hurt people.

However, the above-mentioned parking racks meet various needs at present, the tire sizes of the bicycles affect how the bicycles to be properly parked to the parking racks. For example, the tire diameter of mountain bikes has a variety of sizes ranging from 26 inches to 29 inches, while the diameters of road bikes commonly are 650 mm and 700 mm, so the bicycle parking racks have to be made to meet the needs of the tire sizes of different types of bicycles. In addition, in order to be able to park multiple bicycles, multiple parking racks are needed. The bicycles may have to be positioned side by side. It is also necessary to consider the stability of the parked bicycles and how to support the weight of the bicycles to keep the bicycles stable and not shake.

The present invention intends to provide a bicycle parking rack that is designed to eliminate shortcomings mentioned above.

SUMMARY OF THE INVENTION

The present invention relates to a bicycle parking rack and comprises a base, a first portion and a second portion. The first portion is connected to the base and includes two first parts which are adjustably connected to the first portion. The second portion includes a first tube, a second tube and a third tube. The lower end of the first tube and the lower end of the third tube are respectively connected to the first portion. A portion is connected to the upper end of the third tube. The connection portion is connected to the first tube. The second tube is inserted into the upper end of the first tube. A second part is adjustably connected between the first tube and the third tube. A hook end is formed to the upper end of the second tube so as to hook to the inner periphery of a bicycle wheel. The first parts and the second part contact the outside of a bicycle tire. A connection unit is removably connected between two respective bases of two parking racks.

The primary object of the present invention is to provide a bicycle parking rack wherein the two first prats and the second part are adjustable relative to the first portion and the second portion so as to contact a bicycle wheel tire of different sizes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
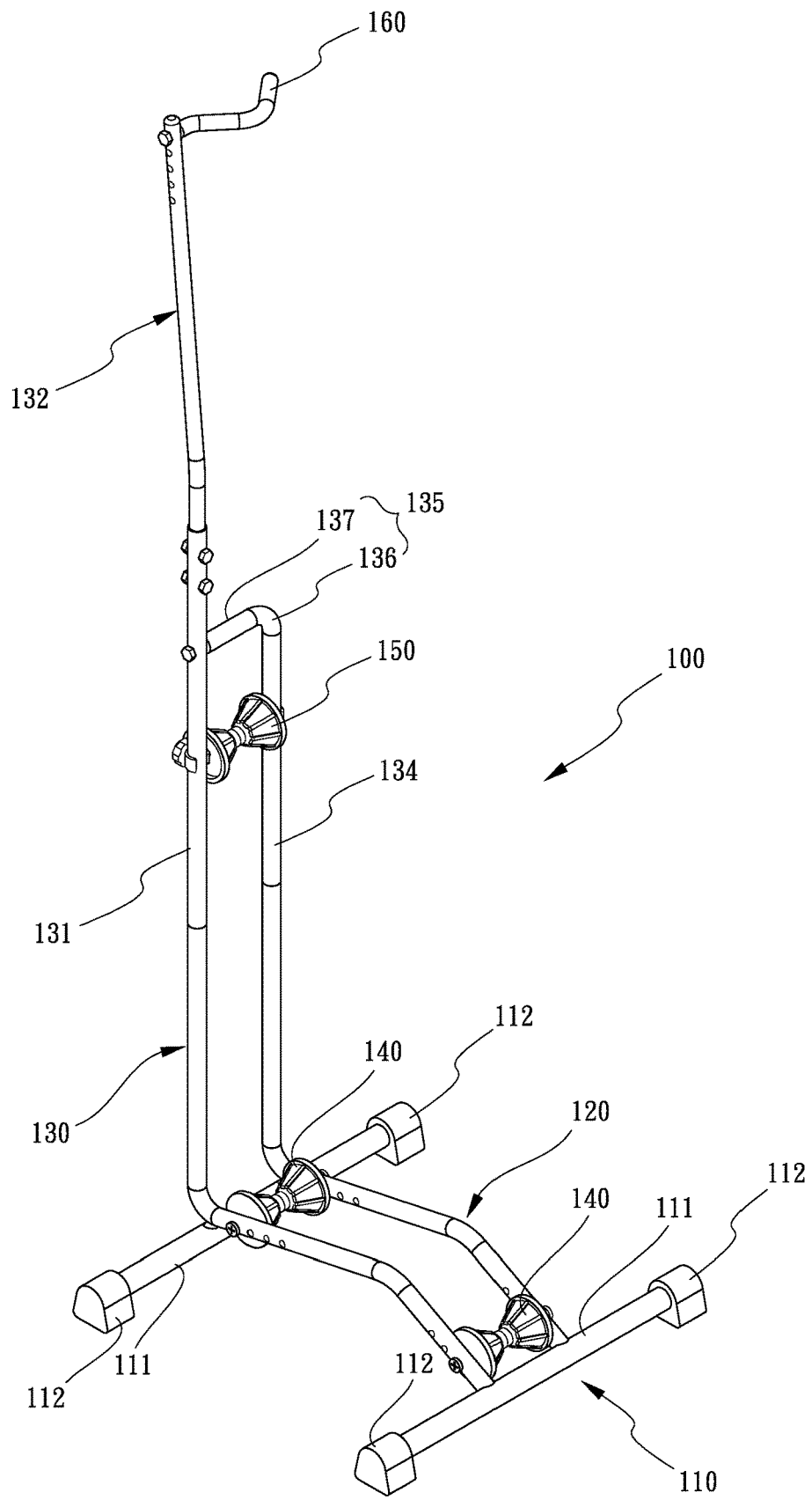
FIG. 1 is a perspective view to show the bicycle parking rack of the present invention.
Figure 2:
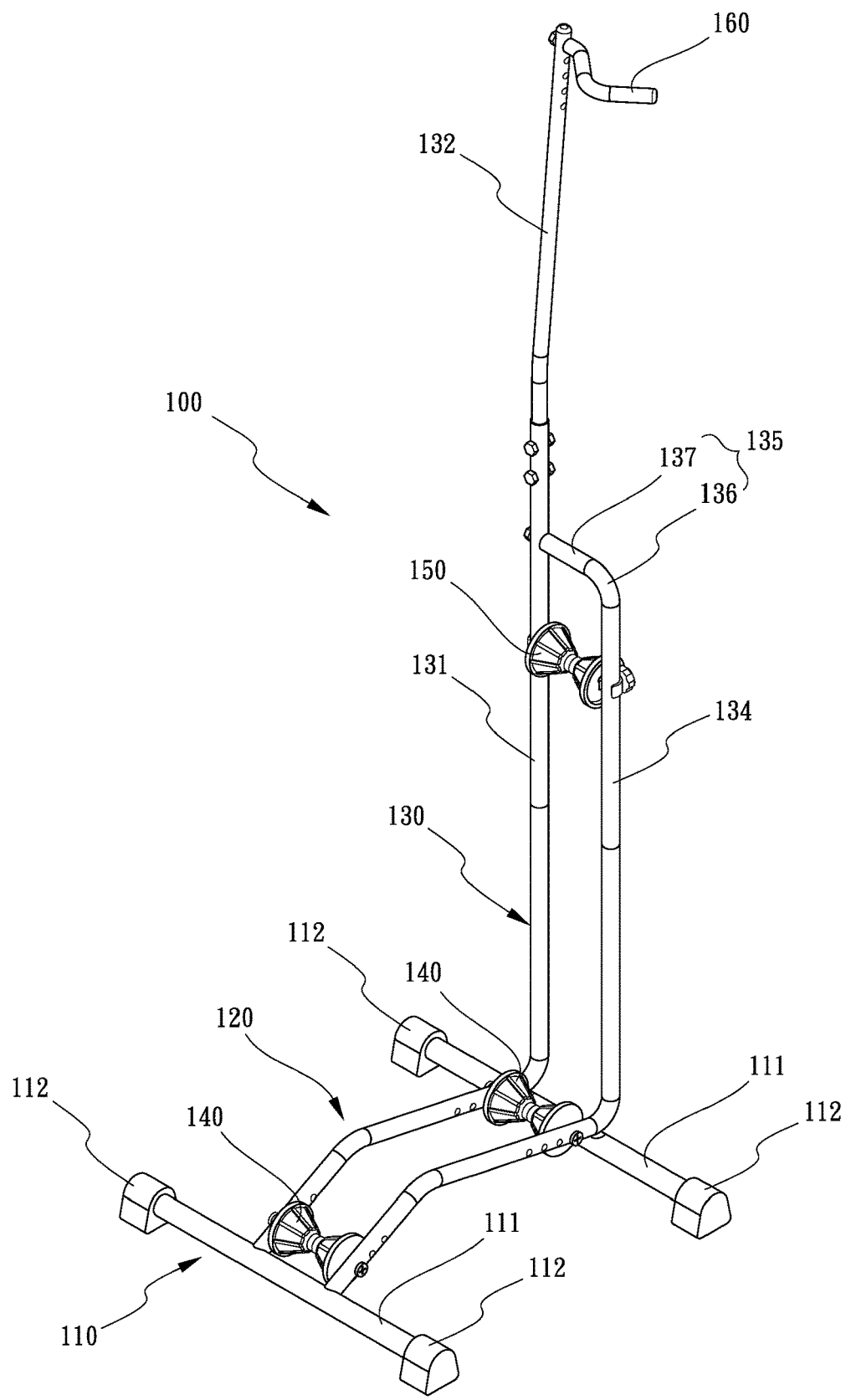
FIG. 2 is another perspective view to show the bicycle parking rack of the present invention.
Figure 3:
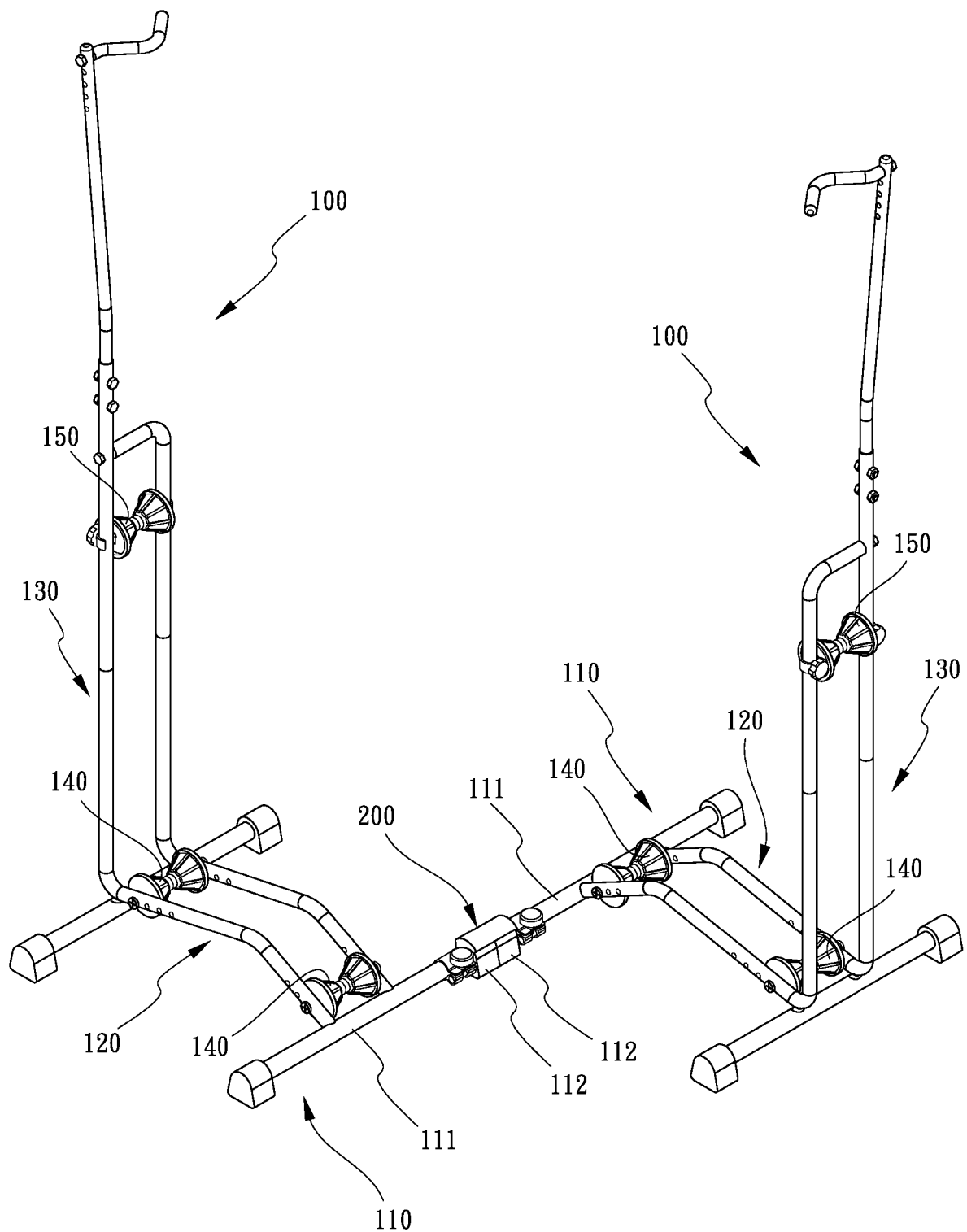
FIG. 3 shows that two bicycle parking racks are connected by the connection unit of the present invention.

Referring to FIGS. 1 to 3, the bicycle parking rack 100 of the present invention comprises a base 110, a first portion 120 and a second portion 130. The first portion 120 is connected to the base 110 and includes two first parts 140 which are adjustably connected to the first portion 120. The first parts 140 are adjustably connected between two parallel tubes of the first portion 120. The second portion 130 includes a first tube 131, a second tube 132 and a third tube 134. The lower end of the first tube 131 and the lower end of the third tube 134 are respectively connected to the first portion 120, such that the second portion 130 is upright relative to the base 110. A connection portion 135 is connected to the upper end of the third tube 134, and the connection portion 135 is connect to the first tube 131, so that the first tube 131 and the third tube 134 are parallel in this embodiment. A second part 150 is adjustably connected between the first tube 131 and the third tube 134. The lower end of the second tube 132 is inserted into the upper end of the first tube 131. A hook end 160 is formed to the upper end of the second tube 132 so as to hook to the inner periphery of a bicycle wheel as shown in FIG. 6 when the bicycle is positioned upright. The two first parts 140 and the second part 150 contact the outside of a bicycle tire as shown in FIGS. 4 and 5.

Figure 4:
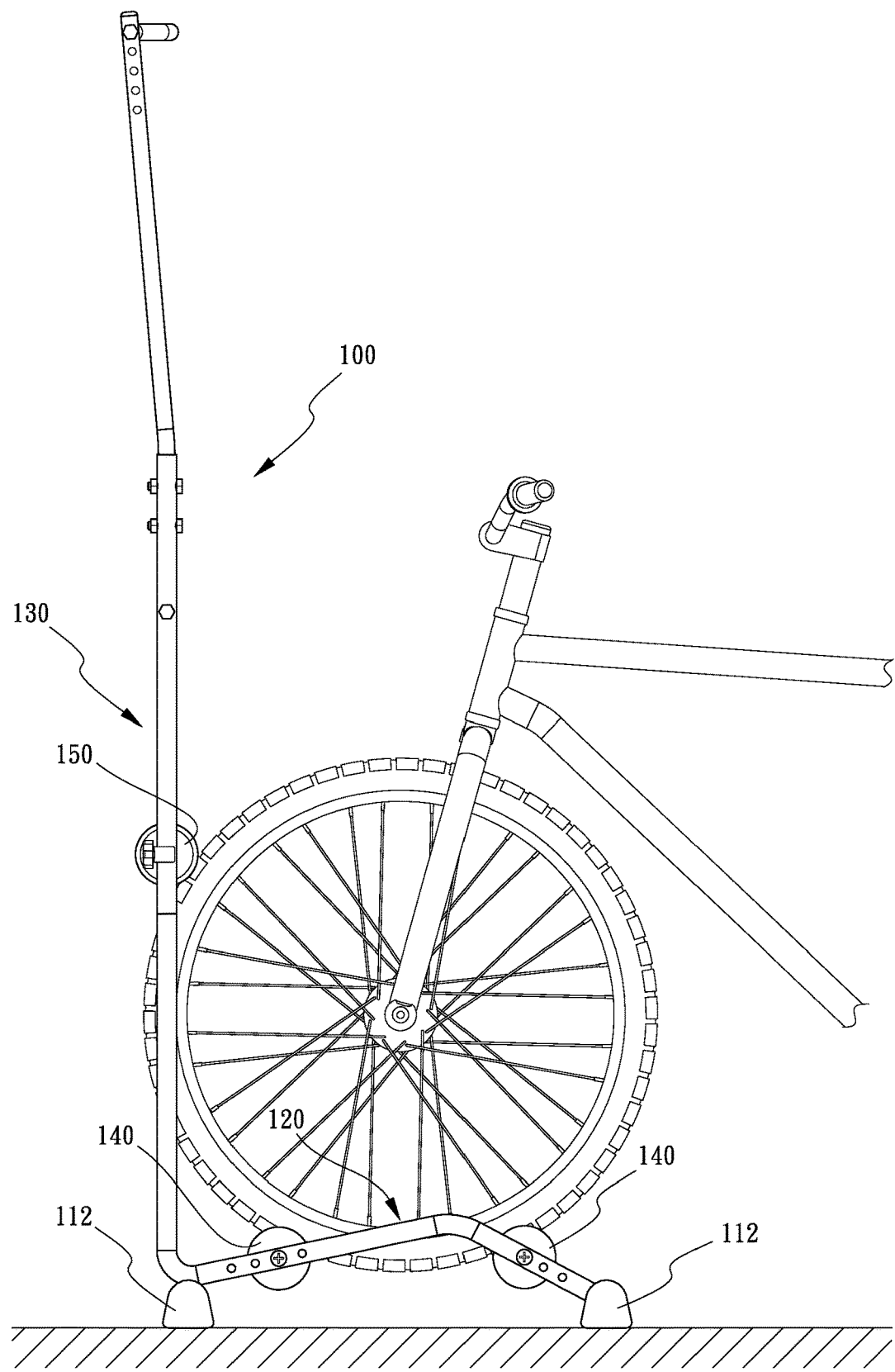
FIG. 4 shows a small bicycle front wheel is positioned between the two first parts and the second part of the bicycle parking rack of the present invention.
Figure 5:
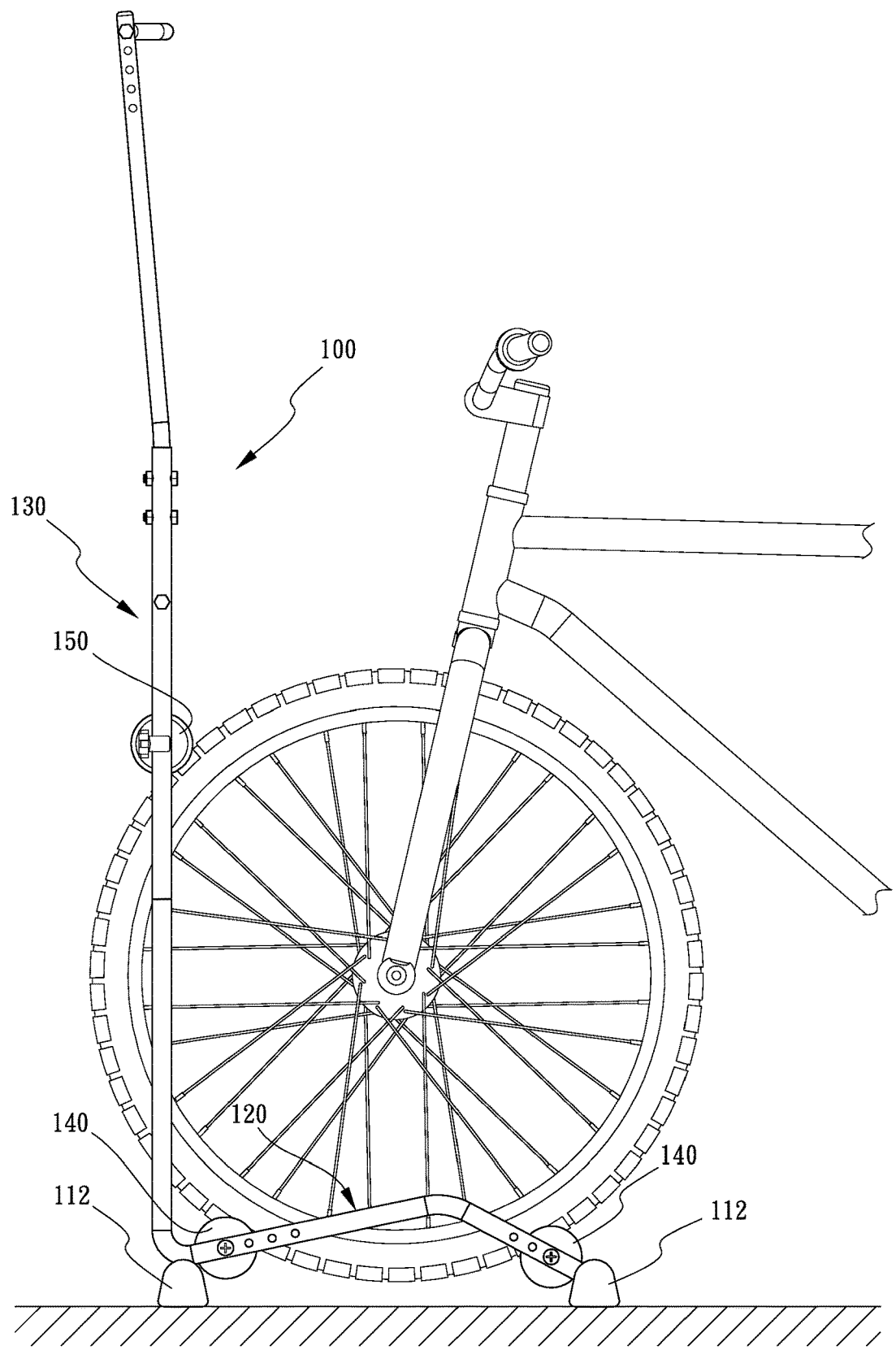
FIG. 5 shows a large bicycle front wheel is positioned between the two first parts and the second part of the bicycle parking rack of the present invention.
Figure 6:
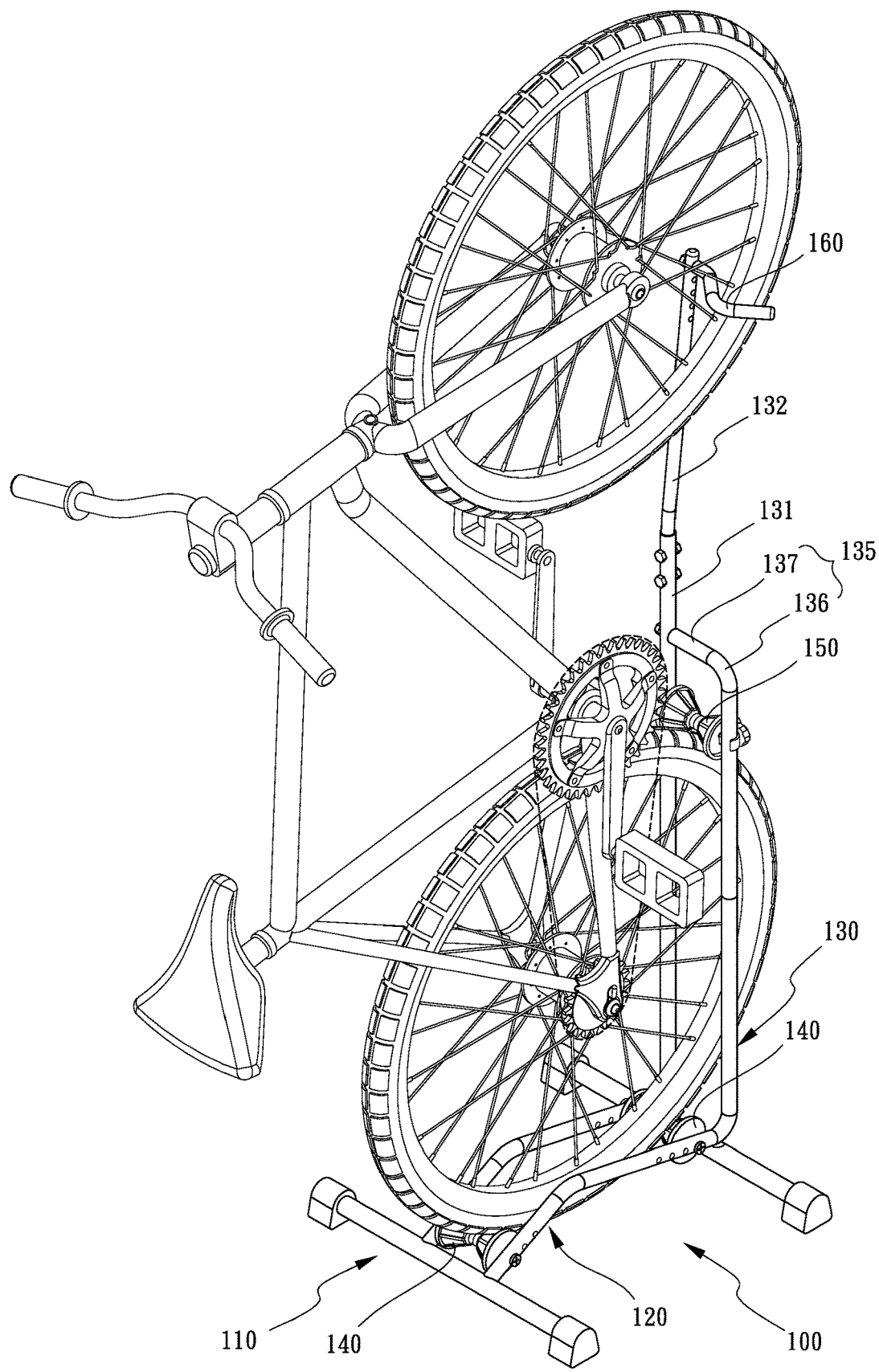
FIG. 6 shows that a bicycle is parted to the bicycle parking rack of the present invention in upright position.

As shown in FIGS. 4 and 5, the two first parts 140 and the second part 150 contact three points of the outside of a bicycle tire to stably position the bicycle tire. In this embodiment, the bicycle tire is a front wheel tire. The two first parts 140 and the second part 150 can be adjustable respectively relative to the first portion 120 and the second portion 130 so as to allow different bicycle tires of different sizes and widths.

Figure 9:
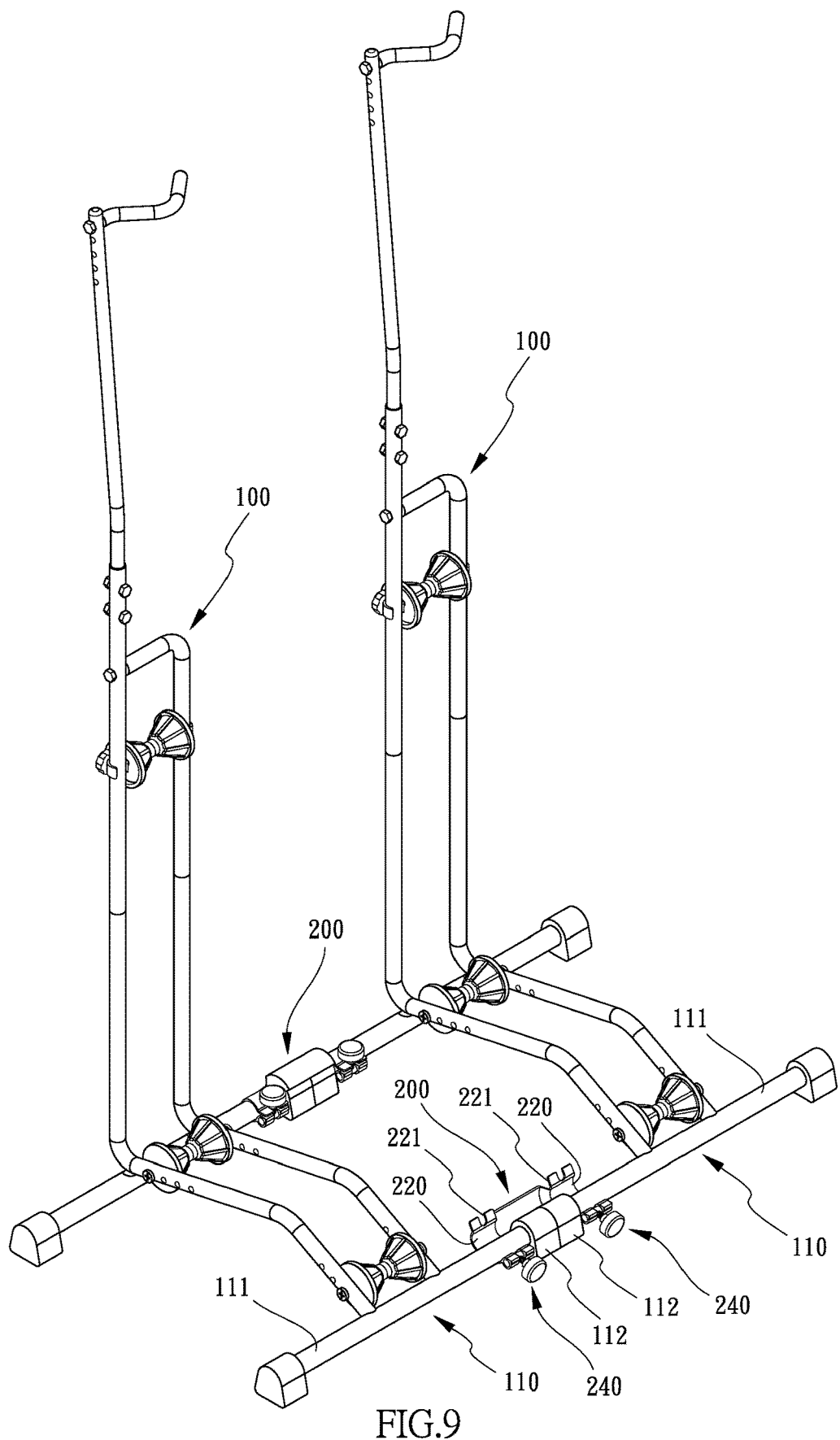
FIG. 9 shows two the bicycle parking racks of the present invention are connected together by two connection units.
Figure 10:
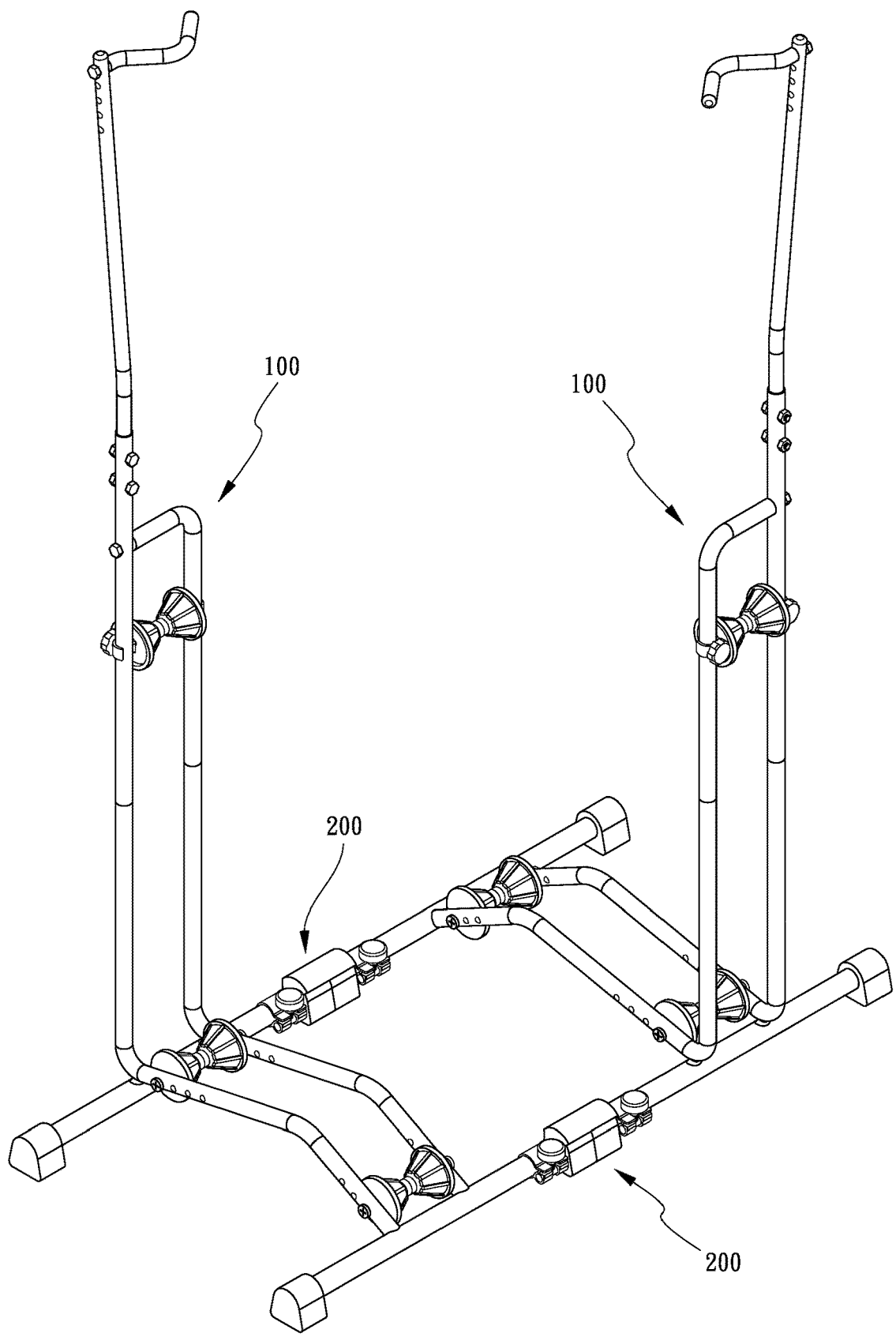
FIG. 10 shows another way for two the bicycle parking racks of the present invention being connected together by two connection units.

A connection unit 200 is removably connected between two respective bases 110 of two parking racks 100 as shown in FIG. 3. As shown in FIGS. 9 and 10, two connection units 200 can be used to connect two bicycle parking racks, wherein the bicycles can be parked from different directions.

Specifically, the base 110 includes two bars 111, and the two tubes of the first portion 120 are connected between the two bars 111. Each bar 111 includes a pad 112 connected to each of two ends thereof. The pads 112 lift the bars 11l a distance from the ground so that the bicycle tire does not contact the ground.

Figure 8:
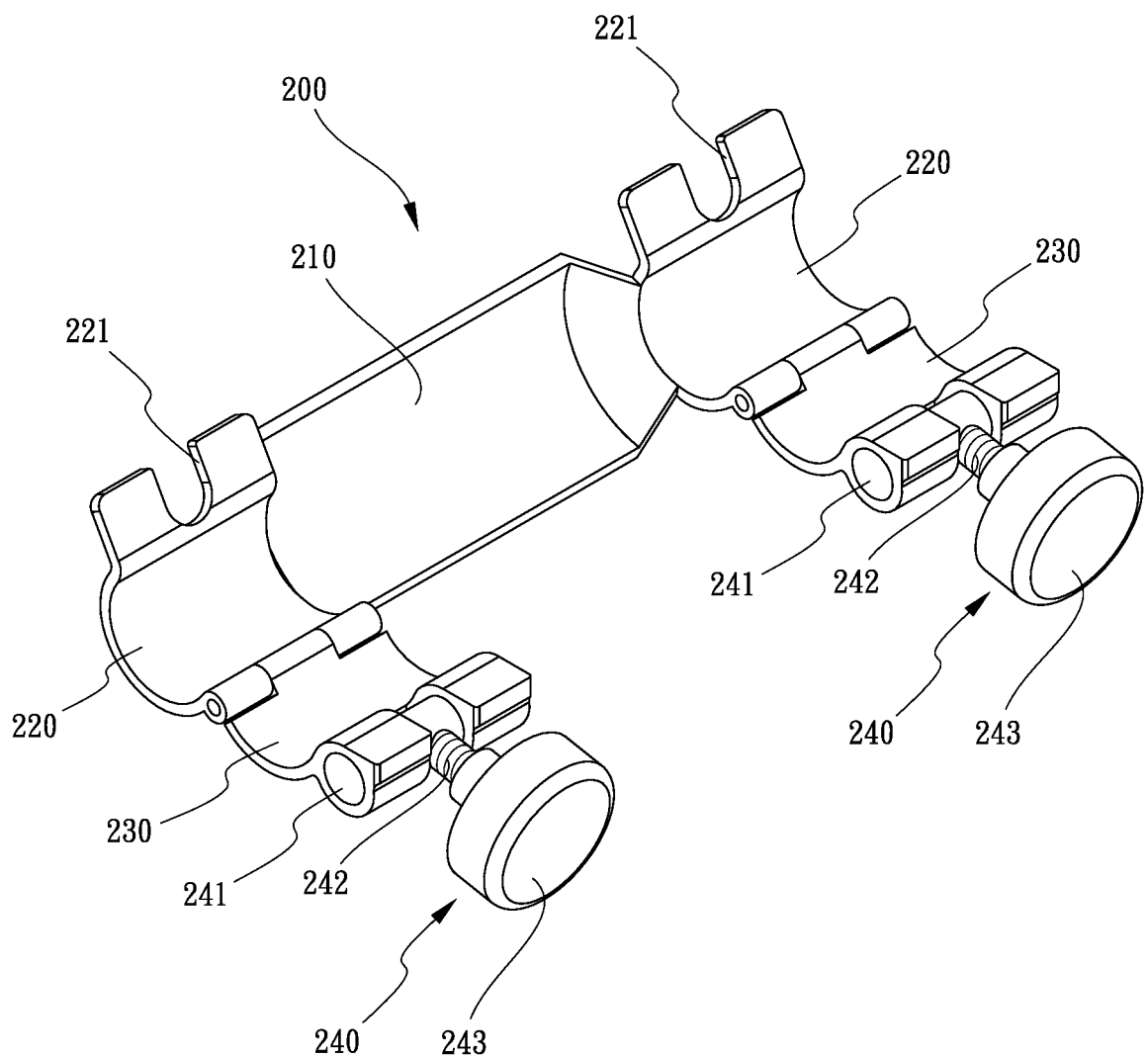
FIG. 8 is a perspective view to show the connection unit of the present invention.

As shown in FIGS. 8 and 9, the connection unit 200 includes a plate 210, and two fixed portions 220 are respectively formed to two ends of the plate 210. A pivotal portion 230 is pivotably connected to each fixed portion 220. The bar 111 is enclosed by the fixed portions 220 and the pivotal portions 230 when the pivotal portions 230 are pivoted to be connected to the fixed portions 220. Each pivotal portion 230 includes a quick-release 240 so as to connect the pivotal portion 230 to the fixed portion 220 corresponding thereto easily. When the connection unit 200 is used, the plate 210 of the connection unit 200 is located above the pads 112 and is not in contact with the pads 12. The quick-release 240 is pivotably connected to the movable portion 230 by a pivot 241. A bolt 242 extends from the knob 243 and is threadedly connected to the middle portion of the pivot 241. When the pivotal portions 230 are pivoted to be connected to the fixed portions 220, the bolt 242 is engaged with a notch 221 of the fixed portion 220, the knob 243 contacts against outside of the fixed portion 220. The quick-release 240 is easily operated without any tool.

Figure 7:
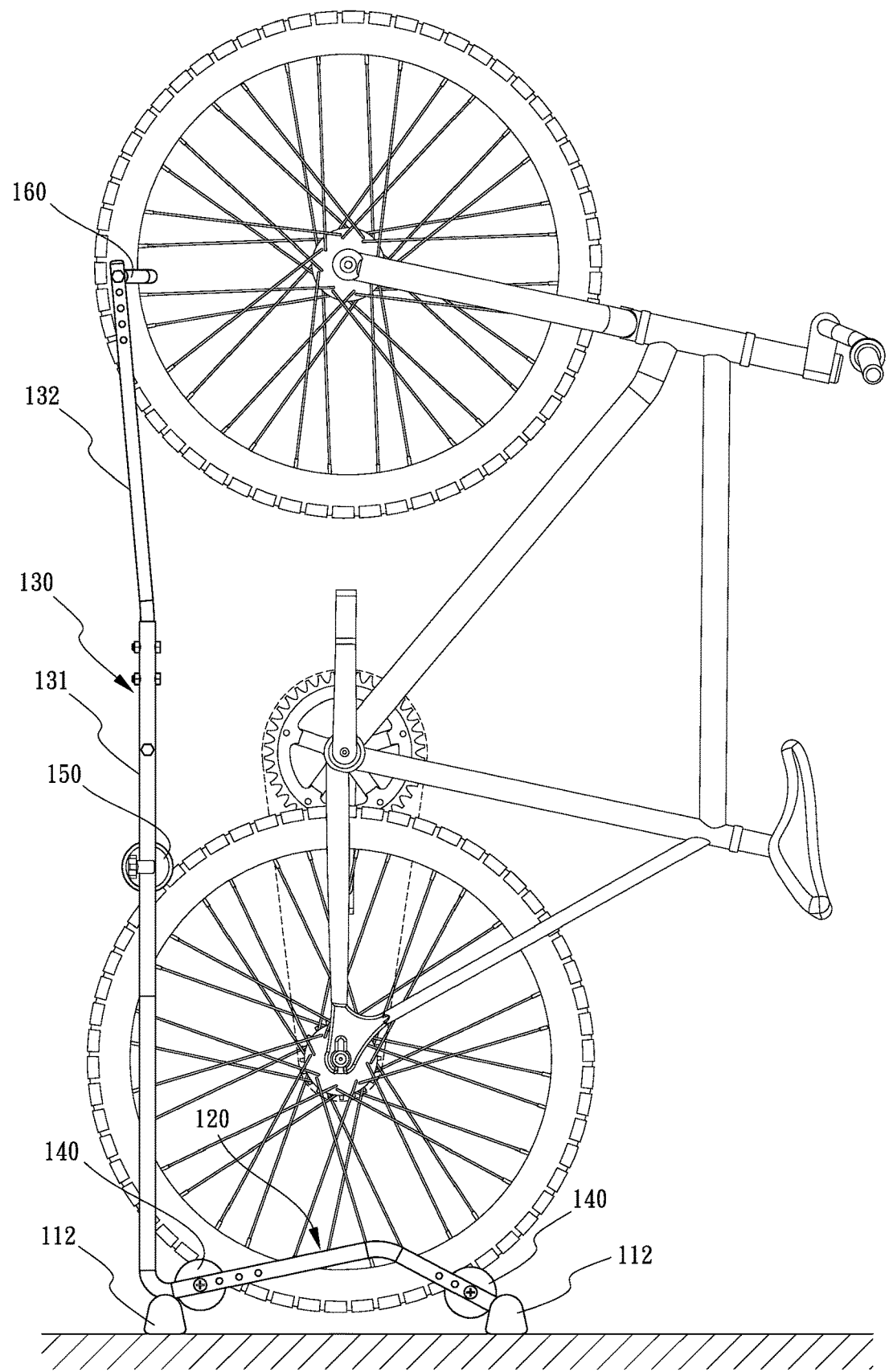
FIG. 7 is a side view of the disclosure in FIG. 6.

As shown in FIGS. 6 and 7, when the bicycle is positioned upright, because the hook end 160 of the second tube 132 extends toward a direction opposite to the one side of the first portion 120, so that the hook end 160 hooks to the rim (the inner periphery of the bicycle wheel) to restrict front the wheel from rotating.

The connection portion 135 of the third tube 134 includes a bent section 136 and a transverse section 137. The bent section 136 is connected between the third tube 134 and the transverse section 137, and the transverse section 137 is perpendicularly connected to the outside of the first tube 131. The weight of the bicycle in upright position is shared by the first and third tubes 131, 134, so that the first tube and the third tube 134 do not rotate.

Figure 11:
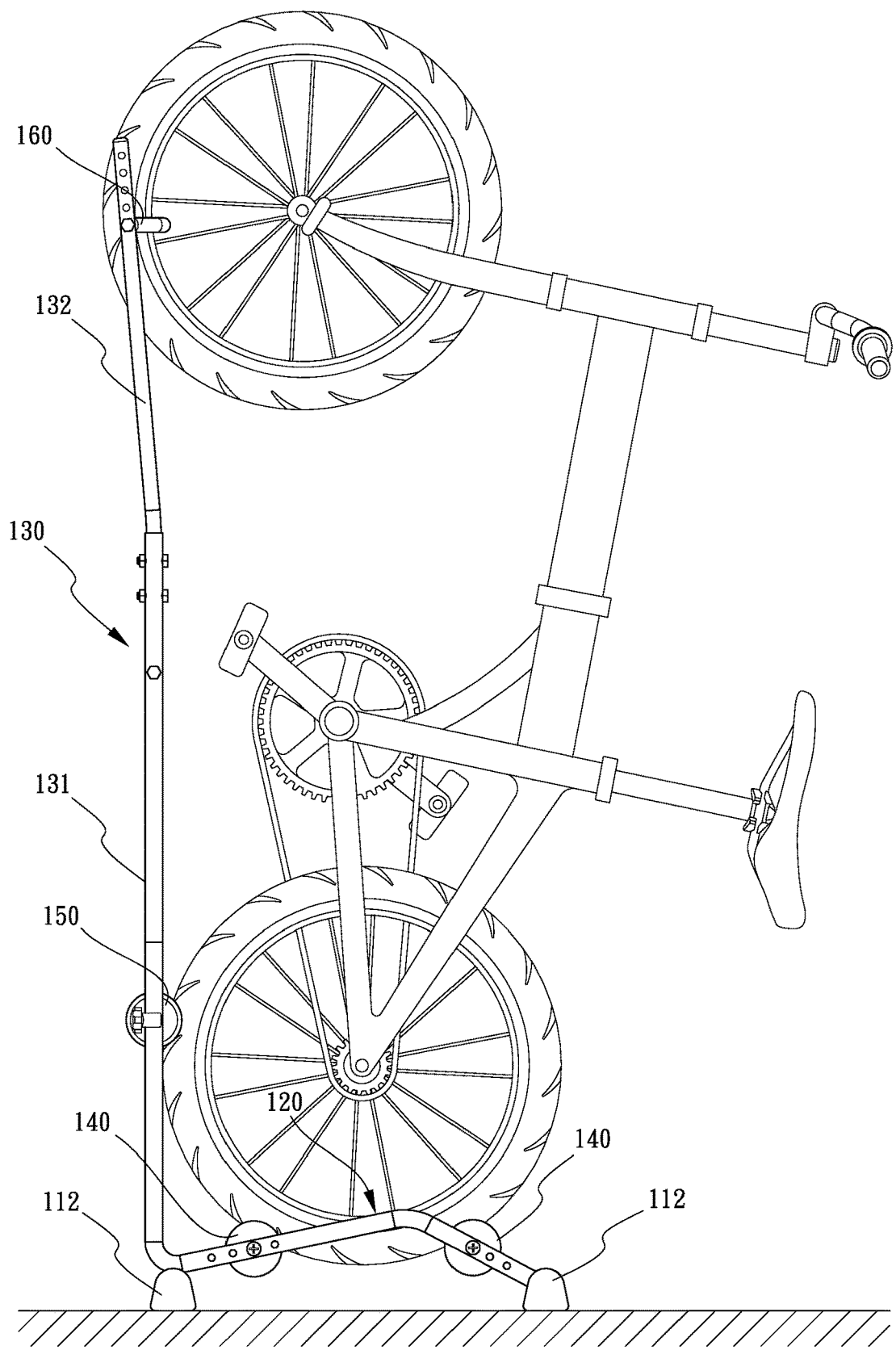
FIG. 11 shows that a foldable bicycle is parted to the bicycle parking rack of the present invention in upright position.

As shown in FIG. 11, a foldable bike can also be parted to the parking rack of the present invention, wherein the front wheel is positioned by the hook end 160, and the rear wheel is position between the first parts 140 and the second part 150.

While we have shown and described the embodiment in accordance with the present invention, it should be clear to those skilled in the art that further embodiments may be made without departing from the scope of the present invention.

What is claimed is:

1. A bicycle parking rack comprising:
  a base, a first portion and a second portion, the first portion connected to the base and including two first parts which are adjustably connected to the first portion;
  the second portion including a first tube, a second tube and a third tube, a lower end of the first tube and a lower end of the third tube respectively connected to the first portion, a connection portion connected to an upper end of the third tube, the connection portion connect to the first tube, the connection portion including a bent section and a transverse section, the bent section connected between the third tube and the transverse section, the transverse section connected to outside of the first tube, the second tube inserted into an upper end of the first tube, a second part adjustably connected between the first tube and the third tube, a hook end formed to an upper end of the second tube so as to hook to an inner periphery of a bicycle wheel, the two first parts and the second part adapted to contact an outside of a bicycle tire, a weight of the bicycle in upright position being shared by the first tube, the third tubes, the bent section and the transverse section, so that the first tube and the third tube do not rotate, and
  a connection unit removably connected between two respective bases of two parking racks.

2. The bicycle parking rack as claimed in claim 1, wherein the base includes multiple bars, each bar includes a pad connected to each of two ends thereof, the connection unit is connected to the two respective bars of two parking racks.

3. The bicycle parking rack as claimed in claim 2, wherein the connection unit includes a plate, two fixed portions are respectively formed to two ends of the plate, a pivotal portion is pivotably connected to each fixed portion, the bar is enclosed by the fixed portions and the pivotal portions, each pivotal portion includes a quick-release so as to connect the pivotal portion to the fixed portion corresponding thereto.

4. The bicycle parking rack as claimed in claim 3, wherein the plate of the connection unit is located above the pads and is not in contact with the pads.

5. The bicycle parking rack as claimed in claim 1, wherein the hook end of the second tube extends toward a direction opposite to the one side of the first portion.

* * * * *